April 24, 1962     C. J. MADSEN ETAL     3,030,809

LIQUID LEVEL INDICATING SYSTEMS

Filed Sept. 23, 1957

United States Patent Office 3,030,809
Patented Apr. 24, 1962

3,030,809
LIQUID LEVEL INDICATING SYSTEMS
Carl J. Madsen and Karl W. Schwanekamp, Whitehall, Pa., assignors to Westinghouse Electric Corporation, East Pittsburgh, Pa., a corporation of Pennsylvania
Filed Sept. 23, 1957, Ser. No. 685,520
5 Claims. (Cl. 73—295)

The present invention relates to liquid level indicating devices and more particularly to a liquid level device adapted for use in highly pressurized or hermetically sealed systems.

Heretofore it has been the practice in the case of highly pressurized vessels, particularly when such vessels are hermetically sealed, to employ, for example, expensive and complicated differential pressure cells for a low liquid level alarm or for tripping means for deenergizing various heating means which are employed for heating liquid in the pressurized vessels. In the case of a heated vessel as aforesaid, the low level alarm desirably is arranged to operate when the liquid level falls to a point within the vessel, which point is just above the aforesaid heating elements. In this manner the heating of the liquid is terminated before one or more of the heating elements energizes above the surface of the liquid, and thus, burning out of the element due to the lower heat conductivity of the vapor existing above the liquid surface is prevented. However, this type of low level alarm or tripping device may become inoperative under certain abnormal conditions and consequently its reliability in addition to its cost and complexity leaves much to be desired.

Other liquid level indicators for heated vessels include a thermally sensitive element or switch which is inserted, usually through reentrant tubing, through a wall of the vessel, in some cases, or in other applications as coupled to the vessel by means of a pair of piping connections such that the liquid level in the piping connections corresponds with that in the vessel. These latter-mentioned indicating devices, however, are not readily adaptable for extremely high pressure applications, and moreover, cannot be hermetically sealed as required in many present day applications. Furthermore, the operating parts of the devices frequently are accessible only with difficulty and require, for example, the removal of packing or plumbing connections, which necessitates depressurizing the vessel when used therefor. Insofar as is known, none of these low level alarm means can be coupled to the vessel by means of a single hermetically sealed connection wherein the operating components of the alarm are readily accessible for adjustment, replacement or maintenance.

In other types of low level alarm systems, the sensing device of the system is provided in the form of a frangible or fusible plug member which is, of course, destroyed upon operation of the low level alarm or tripping means. Although these devices are fairly simple in construction once they are utilized, the operation of the vessel, of course, must be temporarily suspended in order to effect their replacement.

As indicated heretofore, when employing a highly pressurized vessel in certain hazardous applications requiring a substantially zero leakage, it is necessary that all connections to the vessel including associated liquid level indicating and low level alarm or tripping devices be hermetically sealed. For these reasons it is impractical to employ a conventional sight gauge or other visual indicating device. It is therefore necessary to employ hermetically sealed liquid level indicating means which are capable of indicating either desired upper and lower limits of liquid level or increments of liquid level therebetween.

In view of the foregoing, it is an object of the invention to provide a novel and efficient liquid level indicating means.

Another object of the invention is to provide a novel and efficient low liquid level alarm or tripping means.

A further object of the invention is to provide a liquid level indicating means requiring a minimum of component parts and connections to the vessel whose liquid level is being indicated.

Still another object of the invention is to provide a liquid level indicator or low level alarm or tripping means with novel means for efficiently employing the indicator in highly pressurized systems or in hermetically sealed systems or both.

A still further object of the invention is to provide a liquid level indicator or low level alarm having novel and efficient means associated therewith for employing the differing conductivities of the liquid and its vapor contained in a vessel with which the indicator or alarm is used for operating the indicator or alarm.

Another object of the invention is to provide means associated with a liquid level indicator for maintaining the component parts thereof protruding from the vessel at a temperature sufficiently low, during normal operation of the vessel, that personnel coming into accidental contact therewith will not be harmed.

Another object of the invention is to provide a novel combined liquid level indicating and low level alarm system having means associated therewith for operating visual alarm indicia, for deenergizing the heating means, or for actuating other systemic components associated with the vessel.

These and other objects, features and advantages of the invention will be described hereinafter in greater detail, with reference to the accompanying drawings, wherein.

In accordance with the invention a liquid level indicator is arranged with novel means for employing the differing heat conductivities of a liquid and its vapor contained within the vessel, to actuate suitable temperature sensitive means, for example, a thermocouple or bimetallic switch. In one arrangement the switching means is coupled into electrical circuitry having suitable visual or other alarm indicia which when operated indicates the position of the liquid-vapor interface within the vessel. In another arrangement suitable means for deenergizing electric heating elements with which the vessel is equipped are included in the aforesaid circuit in place of the aforesaid indicia or in conjunction therewith. In the latter arrangement the indicator is coupled to the vessel at a position of lowest permissible liquid level which can be tolerated within the vessel. In another arrangement of the invention a plurality of the aforesaid liquid level indicators are mounted in a vertical array in the wall of the vessel, and when connected to suitable circuitry as aforesaid, yield an incremental liquid level indication, with the increments corresponding to the spacing between adjacent ones of the indicators. On the other hand, upper and lower limits only of the liquid level within the vessel can be shown by individually securing a pair of the aforesaid indicators to the vessel wall at positions corresponding to the aforesaid limits. One or both of these limit indicators are for controlling systemic components associated with the vessel, for example, feed or make-up liquid supplied thereto.

In the case of a hermetically sealed, highly pressurized vessel employed in boiling a liquid, such as water, under extremely high pressures, the liquid level indicators are arranged for convenient hermetical sealing to the vessel wall and for withstanding any anticipated pressures developed within the vessel. At the same time the temperature sensing element of the indicator is mounted for ready removability as required by adjustment, replacement or maintenance thereof.

Figure 1:
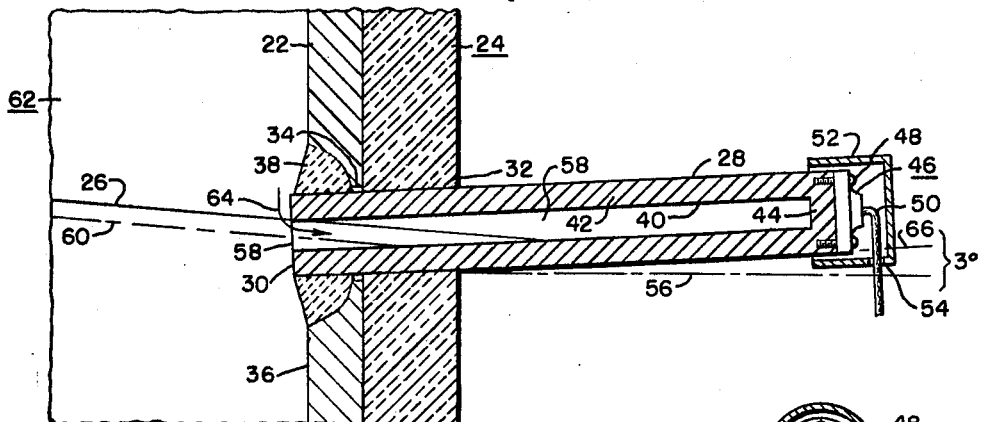
FIGURE 1 is a longitudinally sectional view of one form of liquid level indicator as arranged in accordance with this invention in association with a heated vessel.
Figure 2:
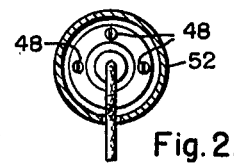
FIG. 2 is an end elevational view of the liquid level indicator illustrated in FIG. 1.

Referring now to FIGS. 1 and 2 of the drawings, the exemplary form of liquid level indicator shown therein and arranged in accordance with the invention is adapted for use with a pressurized vessel 20 (FIG. 4) a wall portion 22 of which is illustrated in FIG. 1. In this example, the walls of the vessel 20 are covered with a layer of thermal insulation indicated generally by reference character 24. The lower part of the pressurized vessel 20 is occupied by a quantity of liquid, the surface of which, or the liquid-vapor interface, is denoted by the reference character 26.

As indicated heretofore, the liquid-level indicator of the invention is actuated by passage of the liquid-vapor interface 26 within the vessel 20 as the liquid level recedes therewithin. In this example then, the indicator includes a hollow tubular member 28, the inward end 30 of which is inserted through suitable aligned apertures 32 and 34 extending through the thermal insulation 24 and the wall 22 of the vessel, respectively. The tubular member 28 when thus inserted terminates adjacent the inner surface 36 of the vessel wall portion 22 and, in this example, is hermetically sealed to the vessel 20 by means of an annular structural and sealing weld 38 joining the inward end 30 of the member 28 to the adjacent portion of the vessel wall 22.

The tubular member 28 of the indicator is fabricated with a longitudinally extending cavity 40 which opens at the inward end 30 of the member 28 and hence communicates with the interior of the vessel 20. In this arrangement, then, the tubular member 28, having been permanently installed in the wall 22 of the vessel, in addition is hermetically sealed thereto, as aforesaid, and its walls 42 are formed in a thickness capable of withstanding any pressure for which the vessel 20 is designed.

The outer end of the tubular elements 28 is closed by an end wall 44 which, of course, seals the cavity 40 within the member 28. In this example of the invention, the end wall 44 desirably is fabricated integrally with the remainder of the tubular element 28 to aid in hermetically sealing this element. A suitable temperature sensing device, denoted generally by the reference character 46, is detachably secured to the outside of the end wall 44 of the tubular member, for example, by means of mounting bolts 48 (FIG. 2). In one application, the sensing device 46 includes a thermostatic switch or a thermocouple-operated switch, or the like; however, any form of mechanical or electromechanical sensing device can be employed which is adaptable for operating suitable alarm indicia or switching means or both. The sensing device 46 is furnished with electrical leads or conductors 50 whereby the device is coupled into suitable electric alarm or switching circuitry such as that described hereinafter in connection with FIG. 4 of the drawings. When installed in its operative position, the sensing device 46 is provided with an appropriate cover 52 into which the outer end of the tubular member 28 together with the sensing device secured thereto is inserted. When thus positioned, the electrical leads 50 of the sensing device are brought out of the cover 52 through an aperture 54 in the wall thereof.

For the purposes of distinguishing most efficiently the passage of the liquid-vapor interface 26 within the vessel 20 relative to the indicator as thus arranged, the tubular member 28 thereof desirably is inclined at a relatively small angle to the horizontal. Accordingly, as shown in FIG. 1, the tubular member 28 extends outwardly and upwardly relative to the vertical wall 22 of the vessel, as indicated by the horizontal reference line 56. The tubular member 28 is mounted in this fashion so that when the liquid-vapor interface within the vessel 20 recedes to a position below the inner opening 58 of the tubular member 28, proper drainage of the central cavity 40 extending through the member 28 and particularly of those areas of this cavity adjacent the outer end of the tubular member 28 will be ensured. With the arrangement shown, when the liquid-vapor interface 26 rises, the entrapped vapor within the cavity 40, will for the most part condense since the outward end of the tubular member will be somewhat cooler than the interior of the vessel, and as a result the cavity 40 will be substantially filled with liquid. The relatively stagnant liquid-filled cavity 40 thus enclosed within the tubular member 28 and disposed between the heated liquid within the vessel 20 and the outer end wall 44 of the tubular member 28 provides a certain amount of thermal isolation or attenuation for the end wall 44 and sensing device 46. In one exemplary arrangement of the invention the outer end of the tubular member 28 is cool enough to touch although pressurized water having a temperature of 650° Fahrenheit is contained within the vessel 20. In the latter arrangement the protruding portion of the tubular member 28, which is fabricated from stainless steel, is approximately six inches in length.

On the other hand, when the liquid-vapor interface 26 is lowered slightly to a plane indicated for an example by the dashed line 60 of FIG. 1, the inclined cavity 40 of the liquid level indicating arrangement then communicates freely with the vapor space 62 (FIGS. 1 and 4), as indicated by the flow arrow 64. Consequently, a portion of the vapor within the space 62 of the vessel flows into the cavity 40 whereupon it is condensed by the outward cooler portions of the tubular member 28 and particularly by the end wall 44. One advantage of providing an inclined tubular member 28 and cavity 40 lies in the fact that the end wall 44 is exposed entirely to vapor flowing from the vessel. When undergoing condensation, the vapor yields heat to the outward portions of the tubular member 28 including its end wall 44, and at the same time additional vapor is drawn into the tubular member 28. Accordingly, the temperature thereof rapidly approaches that of the vapor within the vessel 20 due to the high rate at which heat is transferred to the end wall 44 by condensation of the vapor thereat. The increase in temperature then is employed to actuate the sensing means 46 which in turn energizes or deenergizes, for example, one of the alarm or tripping circuits illustrated in FIG. 4 of the drawings and described hereinafter. Another advantage in providing an inclined tubular member 28 and cavity 40 lies in the fact that the end wall 44 is exposed entirely to vapor flowing from the vessel 20 although only a small proportion of the cavity opening 58 is not covered by the liquid in the vessel. At this level of the interface 26 the response of the low-level alarm will be very nearly as quick as the case when the opening 58 is uncovered entirely. With this arrangement, then, the alarm is very sensitive.

When employing a tubular member 28 having a cavity with a maximum diameter of the order of one-half inch, it has been found that a desirable angle of inclination of the tubular member 28 is approximately 3° as indicated by horizontal line 56 and another reference line 66 (FIG. 1). This angle of inclination is selected such that the entire end wall 44 will be exposed to vapor flowing from the vessel 20 when only a small part of the opening 58 extends above the surface of the liquid in the vessel. However, it is to be understood that the aforesaid angle of inclination can be varied readily as desired depending upon the diameter of the cavity 40 and the length thereof. Moreover, it will be obvious that the tubular member 28 need not be inclined at all, and the invention will still be operative, although less sensitive, as long as at least a portion of the end wall 44 is exposed for contact with the vapor entering the cavity 40 when the liquid level 26 falls below the inner opening 58 thereof.

Figure 3:
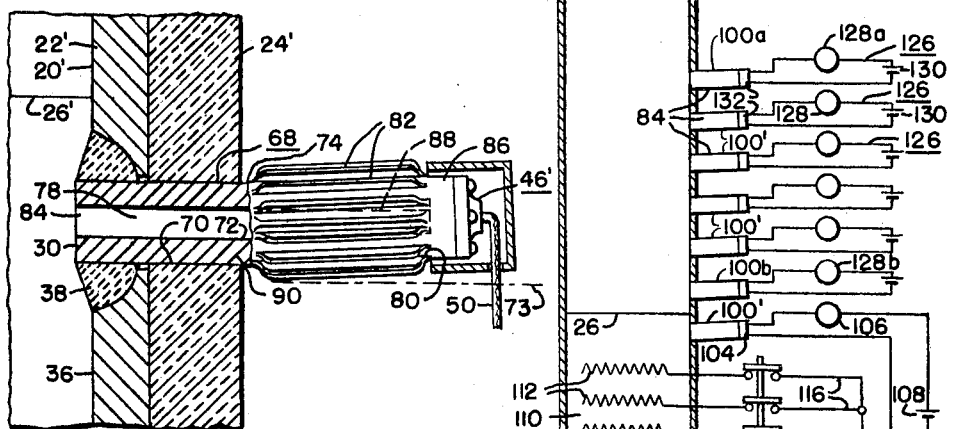
FIG. 3 is an elevational view partly in section of another form of liquid level indicator arranged in accordance with the invention.

It is also contemplated as indicated in FIG. 3 of the drawings that a bent tubular member 68 can be substituted for the tubular member 26 of the indicating arrangement described heretofore. That portion 70 adjacent the inward end 72 of the bent tubular member 68 desirably extends substantially at right angles through the vessel wall portion 22' and the thermally insulating layer 24', but is bent upwardly from the horizontal plane indicated by dashed line 73 at a position adjacent the outer surface of the thermal insulation 24'. The tubular member 68 is furnished with a longitudinally extending cavity 78, and the angle of the bend 74 is sufficient to cause all of end wall 86 to be exposed to vapor flowing from the vessel 20' when the uppermost part of inner opening 84 of the tubular member 68 is uncovered, as shown by dashed lines 88.

In another example of the invention, the protruding portion of either the tubular member 68 (FIG. 3) or the tubular member 28 (FIG. 1) can be shortened by the provision of suitable heat radiating means, for example, a plurality of cooling fins 82 illustrated in FIG. 3 and disposed about the periphery of the associated one 80 of the aforesaid protruding portions. With this arrangement, when the liquid-vapor interface 26' is disposed above the inner opening 84 of the cavity 78, thermal insulation is provided between the outer end wall 86 of the tubular member 68 and the contents of the vessel 20' by the stagnant liquid filling which has been drawn into the cavity 78. Effective additional thermal isolation or attenuation is afforded by dissipation of a substantial portion of the heat being conducted from the vessel 20' through walls 90 of the tubular member 68 (FIG. 3) before this heat is conducted to the outer end of the associated tubular member. The radiation of heat in this manner increases, of course, the temperature differentials applied to the outer end wall 86 (FIG. 3) as the interface 26' rises and falls relative to the opening 84 of the tubular member 68. In order to indicate the aforesaid temperature differential, the outward end of the tubular member 68 is provided with a sensing means 46' such as that described heretofore in connection with FIGS. 1 and 2.

Figure 4:
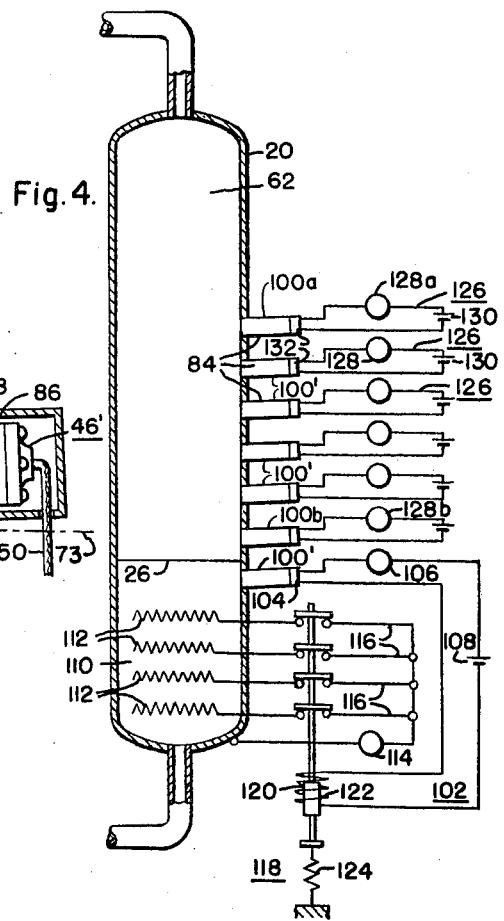
FIG. 4 is an elevational view partly in section of a pressurized hermetically sealed vessel having a liquid level indicating, low level alarm and tripping system associated therewith, and arranged in accordance with the invention.

Referring now to FIG. 4 of the drawings, a low level alarm system and liquid level indicating systems employing one or more of the aforedescribed liquid level indicators are illustrated therein together with appropriate electrical circuitry. In an illustrative application of the invention, the lowermost one 100' of a series of these indicators 100' is utilized in conjunction with a low level alarm or tripping system indicated generally by the reference character 102. In this case the alarm circuit 102 comprises a thermostatic switch 104 or other temperature sensitive switching means secured to the indicator 100' adjacent its outer end and coupled in series with suitable alarm indicia, for example, an electric lamp 106 and a battery or other source of electric potential 108. The thermostatic switch 104 desirably is arranged such that its contacts are normally closed when the liquid-vapor interface 26 is above its lowest permissible level. With this arrangement, of course, the electric lamp 106 will be extinguished when the interface 26 falls below the inward cavity opening of the indicator 100'. As explained heretofore in connection with FIGS. 1 and 3 of the drawings, the temperature sensing device 104 or 46 will become operative due to the increase in temperature occasioned by the fall of the liquid level 26 below the cavity opening thereby permitting the vapor contained within the vessel 20 to communicate freely with the normally entrapped volume within the indicator.

In this application of the invention the liquid 110 contained within the vessel 20 is heated by a plurality of electric immersion heaters 112 which are energized from a suitable source 114 of electric potential. Immersion heaters 112 are coupled to the source 114 through individual conductors 116 in which are connected suitable switching means indicated generally by the reference character 118. The switching means 118 normally is maintained in its operative or closed condition by means of a solenoid 120 connected in series within the alarm circuit 102. The coil 122 of the solenoid is arranged such that when energized it normally maintains the switching means 118 in the circuit closing position. Accordingly, when the liquid vapor interface 26 reaches its lowermost position, the sensing element 104 of the indicator 100' opens the aforementioned normally closed contacts thereby interrupting the alarm circuit 102. When the solenoid 120 is thus deenergized, the switching means 118 is moved to its open circuit position by means of a compressed biasing spring 124. In this manner the immersion heaters 112 are disconnected from the source 114 and heating of the liquid 110 is terminated. It will be appreciated that the switching means 118 can be biased to the circuit closing position by means of a tensioned spring (not shown) and the circuit to the immersion heaters 112 can be interrupted by means of a solenoid switch (not shown) arranged in a normally open circuit position with the sensing means 104 having been provided with normally open contacts. However, the former arrangement would appear to be disadvantageous in the respect that the heaters 112 are deenergized in the event that any part of the low level alarm system accidentally becomes inoperative.

It is also contemplated by the invention that a plurality of the indicators 100', arranged in accordance with the invention, be disposed in a generally vertical array along an upstanding wall portion of the vessel 20. In this latter arrangement, each of the indicators 100', with the exception of the lowermost one 100' thereof, is coupled to an alarm circuit 126 each containing an electric lamp 128, or other suitable indicia, connected in electrical series with a source of electric potential 130. To the outer ends of each of the liquid level indicators 100' is secured a temperature sensing device 132, such as that described heretofore. In this example of the invention it is contemplated that all of the temperature sensing devices 132 are arranged in a manner that the electrical contacts associated individually therewith are all disposed normally in either their open or in their closed positions. These contacts then are coupled individually in the aforementioned alarm circuits 128, and accordingly, as the liquid-level 26 falls below each of the indicators 100', the aforesaid electric lamps 128 successively will be energized, or deenergized, as the case may be. Assuming then that the electric contacts of each temperature sensing means 132 normally are in the inoperative or open circuit position, the number of the electric lamps which are illuminated at any one time gives an approximate indication of the height of the liquid level 26 within the vessel 20, with the energized lamps being associated with those indicators whose cavities are communicating with the vapor space 62 of the vessel.

In another arrangement of the invention, two of the aforementioned liquid-level indicators, for example, 100a and 100b, are disposed respectively at upper and lower desired limits of the liquid-vapor interface 26. Desirably the temperature sensing device or thermostatic switch 132 of the upper indicator 100a is arranged such that its contacts close when the liquid level 26 rises above the indicator 100a, while on the other hand, the thermostatic switch 132 of the lower limit indicator 100b closes when the liquid-vapor interface falls below the indicator 100b. With this arrangement the electric lamps 128a and 128b of the alarm circuits 126, associated respectively with the upper and lower limit indicators 100a and 100b, normally are extinguished when the liquid level is within the selected limits. Thus, illumination of one of these lamps 128a or 128b denotes that the liquid level 26 is too high or too low, respectively.

Obviously, however, the indicators 100a and 100b can be arranged in the converse manner such that both of the associated lamps are turned on when the liquid vapor interface 26 is within its proper limits. It will be appreciated moreover that any of the aforementioned liquid level indicating systems including the incremental system or the upper and lower limit system can be employed in conjunction with the low level alarm system 102 associated with the lowermost one 100' of the indicators secured to the vessel 20.

From the foregoing it will be apparent that novel and efficient forms of liquid level indicating and low level alarm systems have been described herein. In one exemplary embodiment of the invention, the liquid level indicators which are incorporated in these systems are adapted for use with highly pressurized vessels and for hermetically sealed indicators to the vessels as required. However, it is contemplated that the liquid level indicating systems of the invention are of general application although described herein in connection with a pressurized and hermetically sealed vessel.

Accordingly, numerous embodiments of the invention will occur to those skilled in the art without departing from the spirit and scope of the invention. Moreover, it is to be understood that certain features of the invention can be employed without a corresponding use of other features thereof.

Therefore, what is claimed as new is:

1. A liquid level indicator for a heated vessel and the like, said indicator comprising a tubular member secured to a side wall portion of said vessel and opening into the interior of said vessel, said tubular member protruding outwardly of said vessel wall and having heat conductive means closing its outward end, at least the outer portion of said tubular member being inclined upwardly relative to said vessel wall to a position where the entire heat conductive means is disposed at a higher elevation than any part of the opening thereof, and a temperature sensing device secured to said means in heat conductive relation therewith.

2. A liquid level indicator for a heated vessel or the like, said indicator comprising an elongated member secured to a side wall portion of said vessel and protruding outwardly therefrom, said member having a cavity extending substantially along the length thereof and having an opening at the inward end of the tubular member whereby the cavity communicates with the interior of said vessel, the entire outer end of said cavity being disposed at a higher elevation than the entire inward end; a temperature sensitive device secured to said outward end of said member; and cooling means disposed in heat conductive relationship with a portion of said elongated member adjacent said temperature sensing means.

3. A liquid level indicating system for a heated vessel and the like, said system comprising a plurality of liquid level indicators secured to an upstanding wall portion of said vessel and in a generally vertical array relative thereto, each of said indicators including an elongated member protruding outwardly of said vessel and having an elongated cavity inclined generally upwardly and outwardly of said vessel, each of said cavities opening into the interior of said vessel and formed with the entire outward end thereof located at an elevation higher than that of any part of the open end thereof, respectively, a plurality of temperature sensing devices secured individually to the outward ends of said members; and alarm circuitry coupled to said devices.

4. A low liquid level alarm system adapted for use with a heated vessel or the like, said system including an elongated member secured to a side wall portion of said vessel at a position adjacent the lowest allowable level of liquid within said vessel, said member protruding outwardly of said vessel and having an elongated cavity inclined generally upwardly and outwardly of said vessel, said cavity opening into the interior of said vessel and having the entire outward end thereof at an elevation higher than that of any part of its open end, temperature responsive means mounted on the outward end of said member in heat conductive relationship therewith; and alarm indicia coupled to said temperature responsive means for actuation thereby.

5. A liquid level indicator for a vessel having a heated liquid therein and having vapor disposed above the level of said liquid, said indicator comprising a tubular member secured to a side wall of said vessel and opening into the interior of said vessel, said tubular member protruding outwardly of said vessel wall and having heat conductive means forming at least a portion thereof, said heat conductive portion being disposed at an elevation higher than that of any portion of said tubular member opening so that said portion is entirely exposed to vapor flowing into said tubular member when the level of liquid within said vessel falls below any portion of said tubular member opening, and a temperature sensing means secured to said portion in heat conductive relation therewith.

References Cited in the file of this patent

UNITED STATES PATENTS 1,823,397     Guy _____ Sept. 15, 1931

FOREIGN PATENTS 381,811     Great Britain _____ Oct. 13, 1932